United States Patent
Bai (10) Patent No.: US 10,642,820 B2
(45) Date of Patent: May 5, 2020

(54) METHOD FOR DATA PROCESSING AND RELATED PRODUCTS

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 164 days.

(21) Appl. No.: 16/007,496

(22) Filed: Jun. 13, 2018

(65) Prior Publication Data
US 2018/0373749 A1 Dec. 27, 2018

(30) Foreign Application Priority Data
Jun. 21, 2017 (CN) .......................... 2017 1 0476773

(51) Int. Cl.
*G06F 16/00* (2019.01)
*G06F 16/23* (2019.01)
*G06N 5/04* (2006.01)
*G06N 20/00* (2019.01)
*G06N 3/08* (2006.01)

(52) U.S. Cl.
CPC .............. *G06F 16/23* (2019.01); *G06N 3/08* (2013.01); *G06N 5/045* (2013.01); *G06N 20/00* (2019.01)

(58) Field of Classification Search
CPC ........... G06F 16/23; G06N 20/00; G06N 3/08
See application file for complete search history.

(56) References Cited

U.S. PATENT DOCUMENTS 10,394,684 B1 * 8/2019 Sar ...................... G06F 11/3476
2013/0203433 A1   8/2013 Luna et al.
(Continued)

FOREIGN PATENT DOCUMENTS

CN   102075851 A   5/2011
CN   103699823 A   4/2014
(Continued)

OTHER PUBLICATIONS

Extended European search report issued in corresponding European application No. 18176760.9 dated Nov. 26, 2018.
(Continued)

*Primary Examiner* — Cheryl Lewis
(74) *Attorney, Agent, or Firm* — Young Basile Hanlon & MacFarlane, P.C.

(57) ABSTRACT

A method for data processing and related products are provided. A terminal device includes at least one processor and a computer readable storage coupled to the at least one processor. The computer readable storage stores at least one computer executable instruction thereon, which when executed by the at least one processor, cause the at least one processor to carry out actions, including: acquiring first user-habit data; determining a similarity value based on the first user-habit data and standard user-habit data; extracting, from the first user-habit data, normal user-habit data in response to the determination that the similarity value is smaller than a first threshold similarity value; updating the standard user-habit data according to the normal user-habit data.

20 Claims, 5 Drawing Sheets

(56) References Cited

U.S. PATENT DOCUMENTS

| | | | |
|---|---|---|---|
| 2014/0099614 A1* | 4/2014 | Hu | G09B 19/00 434/236 |
| 2014/0123165 A1 | 5/2014 | Mukherjee et al. | |
| 2014/0281959 A1 | 9/2014 | Dominick et al. | |
| 2015/0181289 A1 | 6/2015 | Wheatley | |
| 2017/0011641 A1* | 1/2017 | Barijough | G09B 5/02 |
| 2017/0099311 A1 | 4/2017 | Kesin et al. | |

FOREIGN PATENT DOCUMENTS

| | | | |
|---|---|---|---|
| CN | 104679536 A | 6/2015 |
| CN | 105101302 A | 11/2015 |
| CN | 105224872 A | 1/2016 |

OTHER PUBLICATIONS

International search report issued in corresponding international application No. PCT/CN2018/089840 dated Aug. 29, 2018.

* cited by examiner

METHOD FOR DATA PROCESSING AND RELATED PRODUCTS

CROSS-REFERENCE TO RELATED APPLICATION(S)

This application claims priority to Chinese Patent Application No. 201710476773.0, filed on Jun. 21, 2017, the disclosure of which is hereby incorporated by reference in its entirety.

TECHNICAL FIELD

The present disclosure relates to the field of terminal devices and artificial intelligence (AI), and particularly to a method for data processing and related products.

BACKGROUND

With the popularization of terminal devices (mobile terminals such as mobile phones, tablet PCs, etc.), the terminal devices can support more and more applications and become more powerful. Mobile terminal develops towards diversification and individuation, and becomes an essential electronic product in users' lives. However, research increasingly suggests that how software works and how users use the mobile terminals are the key factors that determine energy consumption and efficiency of the system.

At present, artificial intelligence (AI) has become the development trend of the mobile terminals in the future. However, how to improve intelligence of the mobile terminals has not yet been resolved.

SUMMARY

Implementations of the disclosure provide a method for data processing and related products, to improve intelligence of a terminal device.

According to a first aspect of the disclosure, there is provided a terminal device, which includes at least one processor and a computer readable storage coupled to the at least one processor. The computer readable storage stores at least one computer executable instruction thereon, which when executed by the at least one processor, cause the at least one processor to carry out actions, including: acquiring first user-habit data; determining a similarity value based on the first user-habit data and standard user-habit data; extracting, from the first user-habit data, normal user-habit data in response to the determination that the similarity value is smaller than a first threshold similarity value; updating the standard user-habit data according to the normal user-habit data.

According to a second aspect of the disclosure, there is provided a method for data processing. The method includes the following operations: acquiring first user-habit data; determining a similarity value based on the first user-habit data and pre-stored standard user-habit data; extracting, from the first user-habit data, normal user-habit data in response to the determination that the similarity value is smaller than a first threshold similarity value; updating the standard user-habit data according to the normal user-habit data.

According to a third aspect of the disclosure, there is provided a non-transitory computer-readable storage medium storing a computer program which, when executed by a processor, cause the processor to carry out following actions: acquiring first user-habit data; determining a similarity value based on the first user-habit data and pre-stored standard user-habit data; extracting, from the first user-habit data, normal user-habit data in response to the determination that the similarity value is smaller than a threshold similarity value; updating the standard user-habit data according to the normal user-habit data.

BRIEF DESCRIPTION OF THE DRAWINGS

To illustrate the technical solutions embodied by the implementations of the present disclosure or by the related art more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Hereinafter, technical solutions embodied in implementations of the disclosure will be described in a clear and comprehensive manner in conjunction with the accompanying drawings. It is evident that the implementations described herein are merely some rather than all of the implementations of the disclosure. Those of ordinary skill in the art will be able to derive other implementations based on these implementations without creative work, and all such derived implementations shall fall in the protection scope of the disclosure.

The terms "first" and "second" used in the specification, the claims, and the accompanying drawings of the present disclosure are used for distinguishing between different objects rather than describing a particular order. The terms "include", "comprise", and "have" as well as variations thereof are intended to cover a non-exclusive inclusion. For example, a process, method, system, product, or apparatus including a series of steps or units is not limited to the listed steps or units, it can optionally further include other steps or units that are not listed; alternatively, other steps or units inherent to the process, method, product, or device can be included either.

The term "embodiment" or "implementation" referred to herein means that a particular feature, structure, or characteristic described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

The terminal device involved in the implementations of the present disclosure may include various handheld devices having wireless communication functions, in-vehicle devices, wearable devices, computing devices, or other processing devices connected to the wireless modem, as well as various forms of user equipment (UE), mobile stations (MS), terminal devices, and the like. For the convenience of description, the above-mentioned devices are collectively referred to as a terminal device.

The processor described in the implementations of the present disclosure may be a general-purpose processor, which in turn can be an application processor. Alternatively, the general-purpose processor includes an application processor and an artificial intelligence (AI) module, where the AI module is integrated with or separated from the application processor. In particular, the terminal device described in this implementation can be provided with the AI module and the AI module can be installed in the terminal device separated from the application processor. For example, the application processor can invoke the AI module to achieve artificial intelligence. Furthermore, the AI module can be integrated with the application processor, and therefore, the application processor is equivalent to the AI module. The AI module can be a quantum chip, or a high-density silicon integrated circuit. The AI module may store a machine learning algorithm for training usage habits of a user and perform deep learning on the usage habits of the user, thereby achieving the purpose of intelligent control the terminal device through the AI module.

The AI module can be in the form of hardware and/or software. When the AI module has a hardware configuration, the application processor can be integrated with or separated from the AI module. The disclosure is not limited thereto. As one example, the AI module is integrated with the application processor. When the application processor is a single core processor, the AI module can be an intelligent microprocessing circuit in the application processor. When the application processor is a multi-core processor, the AI module can be a single intelligent microprocessor core in the multi-core processor or an intelligent micro-processing circuit in one microprocessor core.

In one implementation, when the AI module is separated from the application processor, the AI module can be an intelligent micro-processing circuit in any coprocessor (such as a baseband processor, a digital signal processor (DSP), a power management chip, etc.) other than the application processor in an application processor platform architecture. Alternatively, the AI module can be a newly-set intelligent microprocessor other than the application processor in the application processor platform architecture. Alternatively, the AI module can be a newly-set intelligent processing platform separated from an application processor platform. The intelligent processing platform at least includes one dedicated intelligent processor. The intelligent processing platform and the application processor platform are in communication connection. In at least one implementation, the intelligent processing platform is in direct communication connection with a memory, peripherals, etc.

Implementations of the disclosure will be detailed below.

According to implementations of the disclosure, a terminal device is provided. The terminal device can include at least one processor and a computer readable storage coupled to the at least one processor. The computer readable storage is configured to store at least one computer executable instruction thereon, which when executed by the at least one processor, cause the at least one processor to carry out following actions. A first user-habit data is acquired. A similarity value based on the first user-habit data and standard user-habit data is determined. In response to the determination that the similarity value is smaller than a first threshold similarity value, normal user-habit data is extracted from the first user-habit data. The standard user-habit data is updated according to the normal user-habit data.

In at least one implementation, the at least one processor carrying out the action of determining a similarity value based on the first user-habit data and standard user-habit data is caused to carry out following actions. Features are extracted from the first user-habit data to obtain P parameters, where P is an integer greater than 1. Target standard user-habit data corresponding to generation time of the first user-habit data are acquired from the standard user-habit data. Features are extracted from the target standard user-habit data to obtain Q parameters, where Q is an integer equal to or greater than P. The similarity value is determined according to the Q parameters and the P parameters.

In at least one implementation, the variance or covariance between the P parameters and the Q parameters is determined as the similarity value.

In at least one implementation, the first user-habit data contain M data records and M is an integer greater than 1. The at least one processor carrying out the action of extracting, from the first user-habit data, normal user-habit data is caused to carry out following actions. The M data records are analyzed to obtain M parameter sets. The M parameter sets are filtered to obtain N parameter sets. The N parameter sets are trained with a preset negative-sample classifier to obtain K parameter sets, where K is a positive integer. Data records corresponding to the K parameter sets are determined as the normal user-habit data.

In at least one implementation, the at least one processor carrying out the action of updating the standard user-habit data according to the normal user-habit data is caused to carry out following actions. Features are extracted from the normal user-habit data to obtain a first feature set. Features are extracted from the standard user-habit data to obtain a second feature set. An adjustment parameter set corresponding to the second feature set is determined according to the first feature set and the second feature set. Control parameters corresponding to a preset positive-sample classifier are adjusted according to the adjustment parameter set. The standard user-habit data are adjusted through the preset positive-sample classifier adjusted.

According to implementations of the disclosure, a method for data processing is provided. First user-habit data is acquired. A similarity value based on the first user-habit data and pre-stored standard user-habit data is determined. In response to the determination that the similarity value is smaller than a first threshold similarity value, normal user-habit data is extracted from the first user-habit data. The standard user-habit data is updated according to the normal user-habit data.

Figure 1A:
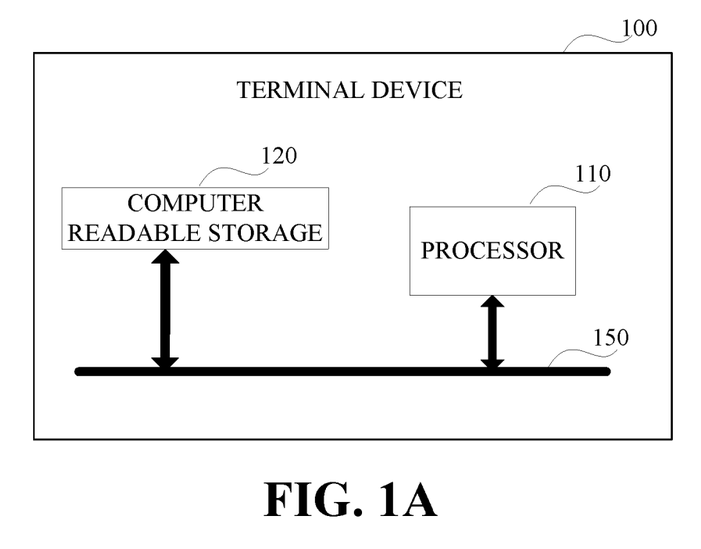
FIG. 1A is a schematic structural diagram illustrating a terminal device according to an implementation of the disclosure.

Referring to FIG. 1A, FIG. 1A is a schematic structural diagram illustrating a terminal device 100 according to an implementation of the disclosure. The terminal device 100 includes at least one processor such as a general-purpose processor 110 and a memory 120 coupled with the general-purpose processor 110 via a bus 150. The memory 120 is configured to store user-habit data (that is, data of user's habits).

Figure 2:
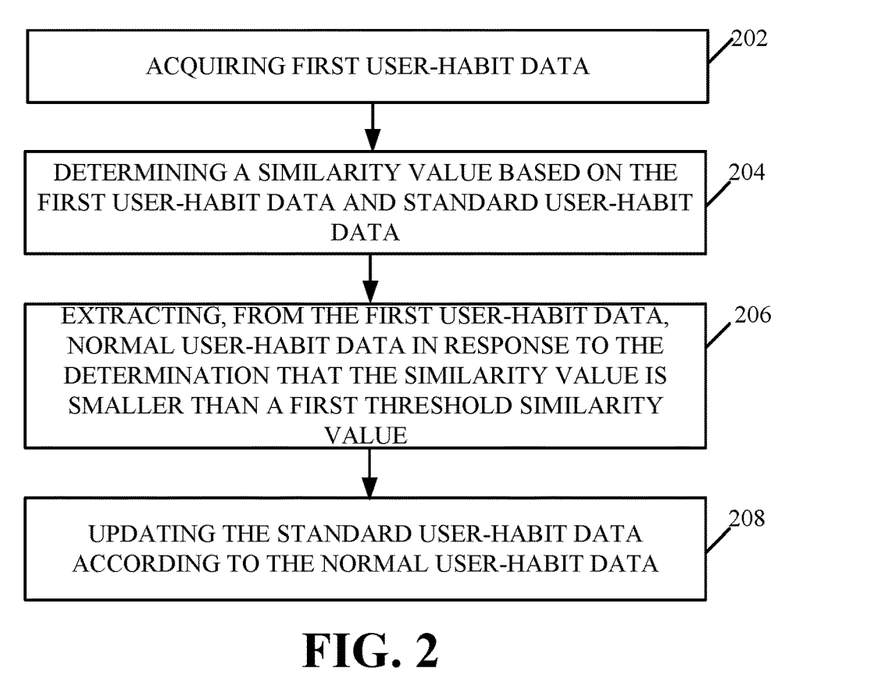
FIG. 2 is a schematic flow diagram illustrating a method for data processing according to an implementation of the disclosure.

The general-purpose processor 110 is configured to perform the method for data processing of the disclosure. As illustrated in FIG. 2, the method starts at block 202.

At block 202, first user-habit data are acquired.

As an example, the first user-habit data are acquired from the memory 120. The first user-habit data are user-habit data in a preset time period. The preset time period may be set by a user himself/herself. Alternatively, the preset time period may be set by a system by default. For example, the preset time period may be last week, last twenty-four hours, last one hour and the like.

In at least one implementation, the first user-habit data may be user-habit data for a preset application(s). The preset application can be a game App, a video App, an Instant Messenger App, a Payment App, or the like.

In at least one implementation, the first user-habit data may further be user-habit data gathered in the process of using the terminal device. That is, the user-habit data are not limited to user-habit data for applications.

In at least one implementation, the first user-habit data may be from usage records of the user. Each time the user operates the terminal device, a corresponding usage record may be generated. Moreover, the first user-habit data may include a large number of usage records.

In at least one implementation, prior to performing the operation at block 202, the general-purpose processor 110 is further configured to perform following operations. Identity verification information entered by the user is acquired and then compared. When the identity verification information is matched successfully, proceed to block 202. It is to be noted that the identity verification information may be at least one of face information, iris information, fingerprint information, voiceprint information, vein information, brain waves, and character strings. As such, it is possible to avoid user-habit data updating triggered due to accidental operation. The identity verification information entered by the user can be acquired when the user conducts operations associated with the user's habits. For example, when the user plays music and touches a touch screen, fingerprint information of the user may be collected from the touch screen.

Alternatively, at block 202, acquiring the first user-habit data can be achieved in following manners. The first user-habit data can be acquired at preset time intervals. The preset time interval may be set by the user or by a system. Therefore, the standard user-habit data of the terminal device can be updated periodicity.

At block 204, a similarity value is determined based on the first user-habit data are and pre-stored standard user-habit data.

The pre-stored standard user-habit data can be set prior to block 202. The standard user-habit data may be obtained by training usage habits (in other words, usage patterns, such as usage records (such as switching on the terminal device, sending information, etc.)) of the user for at least one application over a period of time by the terminal device. The first user-habit data can be compared with the standard user-habit data to obtain a similarity value there between.

At block 206, normal user-habit data are extracted from the first user-habit data based on the determination that the similarity value is smaller than a first threshold similarity value.

In at least one implementation, the first threshold similarity value can be set by the user or by the system. When the similarity value is smaller than the first threshold similarity value, it indicates that user's habits have changed and the standard user-habit data need to be updated to better adapt to the user. In this way, artificial intelligence can be achieved. The first user-habit data may contain data corresponding to accidental operation or normal user-habit data. User habits will change with the environment; that is, different environments may correspond to different user-habit data. For example, usage habits that a user uses a terminal device in the winter may be different from that in the summer.

In general, the user-habit data fluctuate within a range. For example, when the user is accustomed to playing music between 7:00 to 8:00, the user-habit data will be concentrated around 7:30 or evenly distributed between 7:00 and 8:00. However, if the user substantially plays music at about 7:55 for a period of time, it means that user's habits have changed. In this instance, time of playing music may be over 8:00, and data generated when playing music after 8:00 belong to abnormal data and need to be removed. On the other hand, since data distribution between 7:00 and 8:00 has changed, the user-habit data need to be adjusted, so that user-habit data can be adaptively changed along with the user's habits, therefore better meeting requirements of the user.

At block 208, the standard user-habit data are updated according to the normal user-habit data.

In at least one implementation, the standard user-habit data is updated with the normal user-habit data. As a result, the updated user-habit data will be more in line with the current requirements of a user, so as to achieve deep learning for the user's habits.

In at least one implementation, the similarity value is determined as follows.

At A1, features of the first user-habit data are extracted to obtain P parameters, where P is an integer greater than 1.

At A2, target standard user-habit data corresponding to generation time of the first user-habit data are acquired from the standard user-habit data.

At A3, feature extraction is performed on the target standard user-habit data to obtain Q parameters and the similarity value is determined according to the Q parameters and the P parameters.

As described above, the first user-habit data is generated based on the usage records, such that features of the first user-habit data can be extracted; specifically, features of the usage record of the user can be extracted to obtain P parameters. The parameter can be at least one of time, location, application identity, response time delay, probability of accidental operation, and so on. "Time" refers to time of occurrence of a usage record, "location" refers to a place of occurrence of the usage record, "application identity" refers to an application corresponding to the usage record, "response time delay" refers to a time delay that the system responds an operation instruction corresponding to the usage record after the operation instruction is generated, and "probability of accidental operation" can be determined by the system to identify whether an operation is an accidental operation. As can be seen, the standard user-habit data are user-habit data corresponding to a time axis (that is, the user-habit referred to herein includes past habits, current habits, or even estimated future habits of the user), such that the target standard user-habit data corresponding to the generation time of the first user-habit data can be acquired from the standard user-habit data, so as to extract features from the target standard user-habit data, to obtain Q parameters, where Q is a positive integer greater than or equal to P. The P parameters can be compared with the Q parameters; in particular, variance or covariance between the P parameters and the Q parameters can be calculated and used as the similarity value between the first user-habit data and the standard user-habit data.

In at least one implementation, the first user-habit data contain M data records, where M is an integer greater than 1. The general-purpose processor 110 configured to extract the normal user-habit data from the first user-habit data is configured to perform the following.

At B1, the M data records are analyzed to obtain M parameter sets.

At B2, the M parameter sets are filtered (such as removing parameters correspond to accidental operation) to obtain N parameter sets.

At B3, the N parameter sets are trained with a preset negative-sample classifier to obtain K parameter sets, where K is a positive integer; data records corresponding to the K parameter sets are determined as the normal user-habit data. The classifier referred to herein can be implemented with at least one classification function or classification model.

In at least one implementation, the preset negative-sample classifier can be obtained according to previous user's habits. It is to be noted that a positive-sample classifier can be obtained from a normal user-habit data (that is, positive samples) and a negative-sample classifier can be obtained from abnormal user-habit data (that is, negative samples).

In particular, the M data records can be analyzed to obtain corresponding time, location, application identity, response time delay, and probability of the accidental operation, and so on. "Time" refers to time of occurrence of a usage record, "location" refers to a place of occurrence of the usage record, "application identity" refers to an application corresponding to the usage record, "response time delay" refers to a time delay that the system responds an operation instruction corresponding to the usage record after the operation instruction is generated, and "probability of accidental operation" can be determined by the system to identify whether an operation is an accidental operation. As such, M parameter sets can be obtained, where each data record corresponds to each parameter set. Removing accidental operation can be performed on the M parameter sets; that is, data records corresponding to the accidental operation can be removed, and thus N parameter sets can be obtained. Furthermore, the N parameter sets can be trained with the preset negative-sample classifier to filter out data that does not meet the requirements of the negative sample, to obtain K parameter sets. Therefore, data records corresponding to the K parameter sets can be used as the normal user-habit data.

In at least one implementation, the general-purpose processor 110 configured to update the standard user-habit data according to the normal user-habit data is configured to perform the follows.

At C1, feature extraction is performed on the normal user-habit data to obtain a first feature set.

At C2, feature extraction is performed on the standard user-habit data corresponding to the normal user-habit data to obtain a second feature set.

At C3, an adjustment parameter set corresponding to the second feature set is determined according to the first feature set and the second feature set.

At C4, control parameters corresponding to a preset positive-sample classifier are adjusted according to the adjustment parameter set.

At C5, the standard user-habit data are adjusted with the preset positive-sample classifier adjusted.

In at least one implementation, features of the normal user-habit data can be extracted to obtain the first feature set and features of the standard user-habit data corresponding to the normal user-habit data can be extracted to obtain the second feature set. The adjustment parameter corresponding to the second feature set can be determined according to the first feature set and the second feature set, such that the control parameters corresponding to the preset positive-sample classifier can be adjusted according to the adjustment parameter set, after that, the standard user-habit data can be adjusted through the adjusted preset positive-sample classifier, so as to obtain the adjusted standard user-habit data. The preset positive-sample classifier can be constructed on the basis of the previous user's habits, and each positive-sample classifier corresponds to some control parameters for controlling intensity of adjustment of the classifier. In this way, the standard user-habit data are adjusted to better adapt changes in user's habits so as to facilitate the user. In addition, the terminal device can also have the capability of deep learning. After extracting the features, feature of the feature set obtained can be at least one of time, location, application identity, response time delay, and probability of the accidental operation, where "time" refers to time of occurrence a usage record, "location" refers to a place of occurrence of the usage record, "application identity" refers to an application corresponding to the usage record, "response time delay" refers to a time delay that the system responds an operation instruction corresponding to the usage record after the operation instruction is generated, and "probability of accidental operation" can be determined by the system to identify whether an operation is an accidental operation.

It is to be noted that the foregoing preset positive-sample classifier or the preset negative-sample classifier can be at least one of a neural network classifier, a genetic algorithm classifier, a support vector machine (SVM) classifier, a cascade-type classifier (for example, neural network cascading with SVM (neural network+SVM)), and so on.

In at least one implementation, the general-purpose processor 110 is further configured to: count the number of times of occurrence of abnormal events; proceed to acquire the first user-habit data when the number of times of occurrence is greater than a second threshold similarity value.

The abnormal events may be events that do not occur in a normal time period. For example, a user usually plays music between 7:00 and 8:00 and playing music in a time period between 6:45 to 8:15 will be considered as a normal event, on the other hand, when the user plays music at 8:30, it will be considered as an abnormal event. In addition, the second threshold similarity value can be set by the user or the system. As a result, the number of times of occurrence of abnormal events can be counted and operations at block 202 will be performed when the number of times of occurrence is greater than the second threshold similarity value.

Figure 1B:
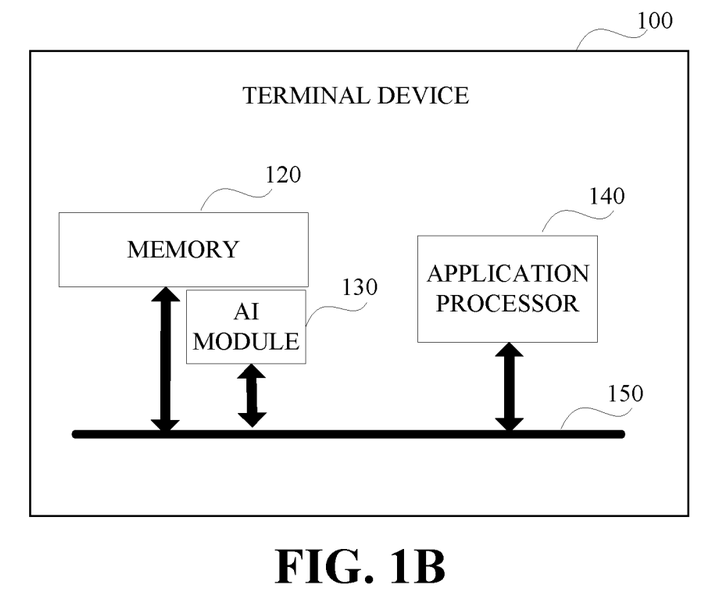
FIG. 1B is a schematic structural diagram illustrating another terminal device according to an implementation of the disclosure.

In at least one implementation, referring to FIG. 1B. FIG. 1B illustrates an alternative structure of the terminal device depicted in FIG. 1A. The general-purpose processor 110 illustrated in FIG. 1A can include an application processor 140 and an artificial intelligence (AI) module 130. The application processor 140 is separated from the AI module 130. The AI module 130 is configured to perform at least one operation described in any implementation above. Alternatively, the application processor 140 is configured to invoke the AI module 130 to perform at least one operation described in any implementation above.

Figure 1C:
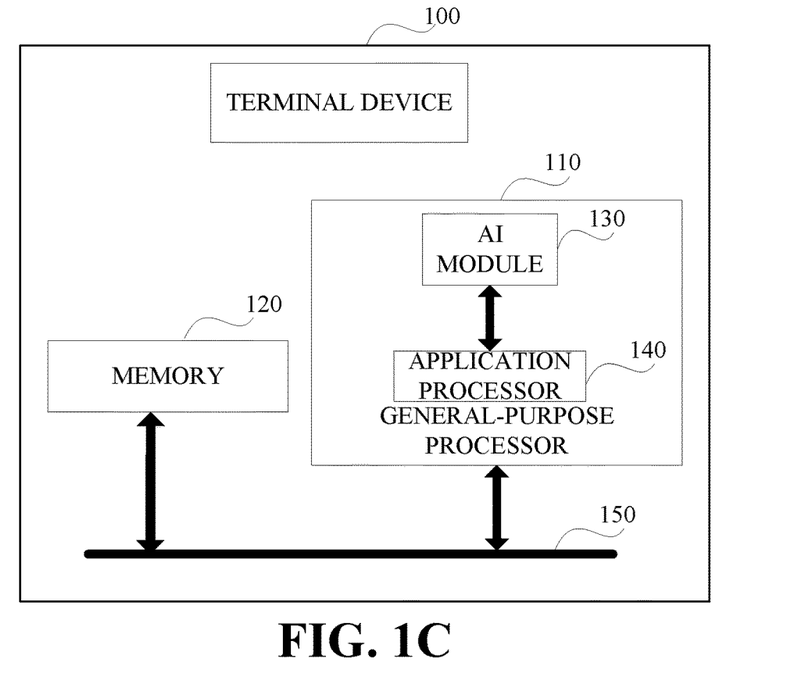
FIG. 1C is a schematic structural diagram illustrating another terminal device according to an implementation of the disclosure.

In at least one implementation, referring to FIG. 1C. FIG. 1C illustrates another alternative structure of the terminal device depicted in FIG. 1A. The general-purpose processor 110 illustrated in FIG. 1A may include an application processor 140 and an AI module 130. The application processor 140 is integrated with the AI module 130. The AI module 130 is configured to perform at least one operation described in any implementation above. Alternatively, the application processor 140 is configured to invoke the AI module 130 to perform at least one operation described in any implementation above.

According to the implementations of the disclosure, in the terminal device, first user-habit data is acquired and the similarity value is determined based on the first user-habit data and pre-stored standard user-habit data. When the similarity value is smaller than a first threshold similarity value, the normal user-habit data will be extracted from the first user-habit data and then the standard user-habit data will be updated according to the normal user-habit data to obtain the user-habit data. When the user-habit data are not in a preset range, the user-habit data can be updated. In this way, the user-habit data can be updated in time, therefore improving intelligence of the terminal device.

Figure 3:
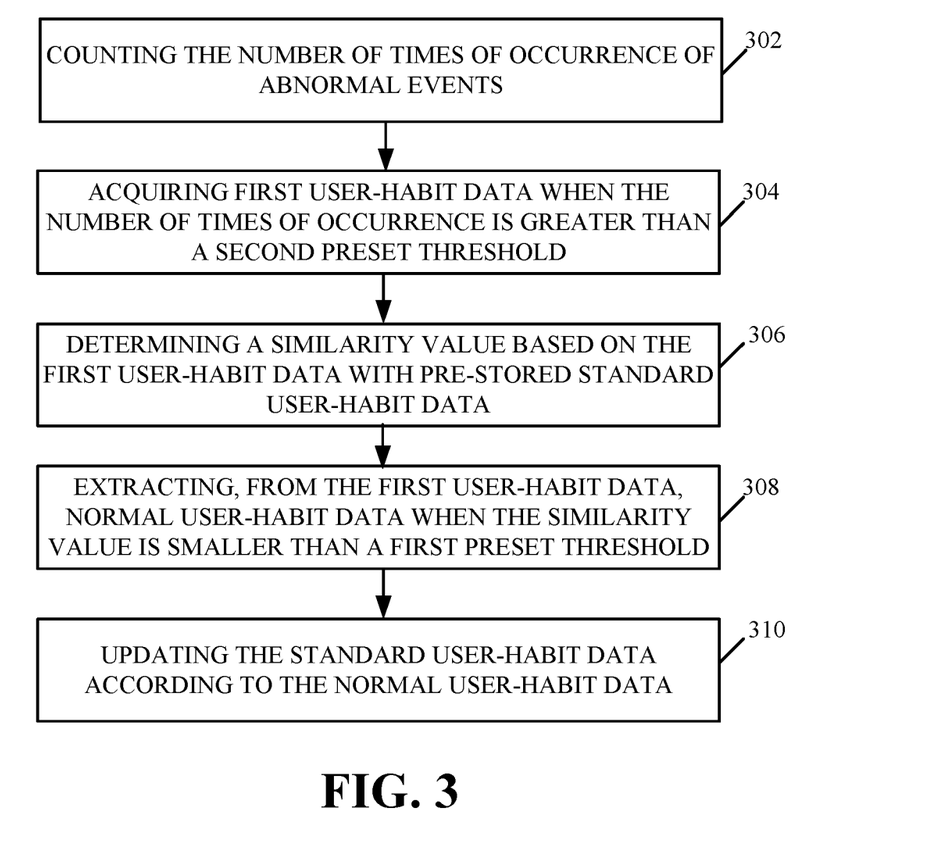
FIG. 3 is a schematic flow diagram illustrating another method for data processing according to an implementation of the disclosure.

FIG. 3 is a schematic flow diagram illustrating a method for data processing according to an implementation of the disclosure. The method is applicable to a terminal device including a general-purpose processor illustrated in FIG. 1A, FIG. 1B, or FIG. 1C. As illustrated in FIG. 3, the method starts at block 302 and differs from the method described with reference to FIG. 2 in operations at block 302 and block 304.

At block 302, the number of times of occurrence of abnormal events is counted.

At block 304, first user-habit data is acquired when the number of times of occurrence is greater than a second threshold similarity value.

At block 306, a similarity value is determined based on the first user-habit data and pre-stored standard user-habit data.

At block 308, normal user-habit data is extracted from the first user-habit data, when the similarity value is smaller than a first threshold similarity value.

At block 310, the standard user-habit data is updated according to the normal user-habit data.

For operations at blocks 302-310, reference may be made to the above corresponding operations, and details are not described herein again.

According to implementations of the disclosure, the number of times of occurrence of the abnormal events is determined. When the number of times of occurrence is greater than the second threshold similarity value, the similarity value is obtained based on the first user-habit data and the pre-stored standard user-habit data. When the similarity value is smaller than the first threshold similarity value, the normal user-habit data will be extracted from the first user-habit data and the standard user-habit data will be updated according to the normal user-habit data to obtain the user-habit data. When the user-habit data are not in a preset range, the standard user-habit data can be updated, such that the user-habit data can be updated in time and intelligence of the terminal device can be improved.

Figure 4:
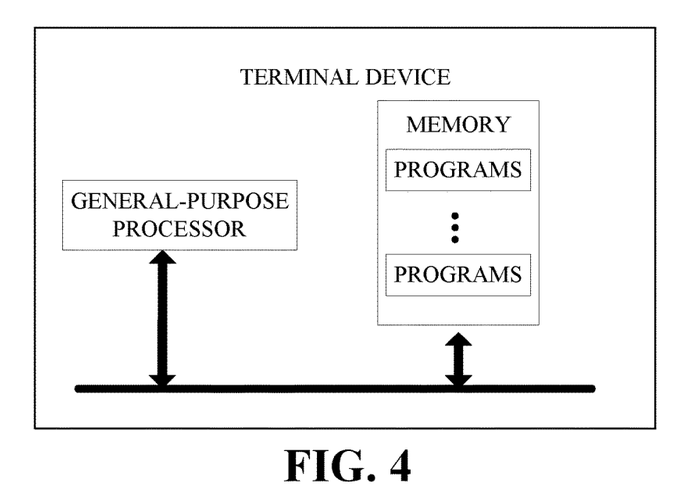
FIG. 4 is a schematic structural diagram illustrating yet another terminal device according to an implementation of the disclosure.

Referring to FIG. 4, FIG. 4 illustrates a terminal device according to an implementation of the disclosure. The terminal device includes a purpose-purpose processor, a memory, and at least one program. The general-purpose processor may refer to a general-purpose processor of a terminal device illustrated in FIG. 1A, FIG. 1B, or FIG. 1C.

The at least one program is stored in the memory and configured to be performed by the general-purpose processor. The at least one program includes instructions for performing the following operations.

The general-purpose processor is controlled to acquire first user-habit data.

The general-purpose processor is controlled to compare the first user-habit data with pre-stored standard user-habit data to obtain a similarity value.

The general-purpose processor is controlled to extract, from the first user-habit data, normal user-habit data when the similarity value is smaller than a first threshold similarity value.

The general-purpose processor is controlled to update the standard user-habit data according to the normal user-habit data.

In at least one implementation, instructions of the at least one program configured to compare the first user-habit data with the pre-stored standard user-habit data are configured to control the general-purpose processor to: extract features from the first user-habit data to obtain P parameters, where P is an integer greater than 1; acquire, from the standard user-habit data, target standard user-habit data corresponding to generation time of the first user-habit data; extract features from the target standard user-habit data to obtain Q parameters; determine the similarity value according to the Q parameters and the P parameters.

In at least one implementation, the first user-habit data contain M data records, where M is an integer greater than 1.

In at least one implementation, instructions of the at least one program configured to extract, from the first user-habit data, normal user-habit data are configured to control the general-purpose processor to: analyze M data records to obtain M parameter sets and filter the M parameter sets to obtain N parameter sets; train the N parameter sets with a preset negative-sample classifier to obtain K parameter sets, where K is a positive integer; determine data records corresponding to the K parameter sets as the normal user-habit data.

In at least one implementation, instructions of the at least one program configured to update the standard user-habit data according to the normal user-habit data are configured to control the general-purpose processor to: extract features from the normal user-habit data to obtain a first feature set; extract features from the standard user-habit data corresponding to the normal user-habit data to obtain a second feature set; determine an adjustment parameter set corresponding to the second feature set according to the first feature set and the second feature set; adjust control parameters corresponding to a preset positive-sample classifier according to the adjustment parameter set; adjust the standard user-habit data through the preset positive-sample classifier adjusted.

In at least one implementation, the at least one program further includes instructions configured to control the general-purpose processor to: count the number of times of occurrence of abnormal events; proceed to acquire the first user-habit data when the number of times of occurrence is greater than a second threshold similarity value.

Figure 5A:
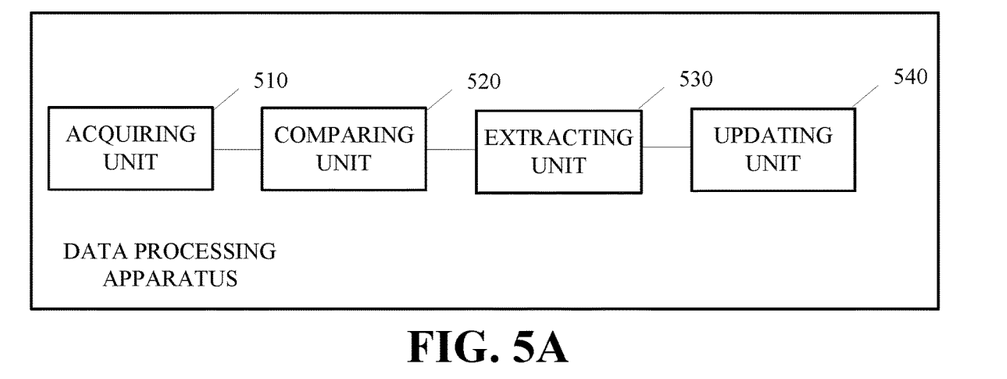
FIG. 5A is a schematic structural diagram illustrating a data processing apparatus according to an implementation of the disclosure.

Referring to FIG. 5A, FIG. 5A is a schematic structural diagram illustrating a data processing apparatus according to an implementation of the disclosure. The apparatus is applicable to a terminal device. The terminal device includes a general-purpose processor. The data processing apparatus includes an acquiring unit 510, a comparing unit 520, an extracting unit 530, and an updating unit 540.

The acquiring unit 510 is configured to control the general-purpose processor to acquire first user-habit data.

The comparing unit 520 is configured to control the general-purpose processor to compare the first user-habit data with pre-stored standard user-habit data to obtain a similarity value.

The extracting unit 530 is configured to control the general-purpose processor to extract, from the first user-habit data, normal user-habit data when the similarity value is smaller than a first threshold similarity value.

The updating unit 540 is configured to control the general-purpose processor to update the standard user-habit data according to the normal user-habit data.

In at least one implementation, the comparing unit 520 configured to control the general-purpose processor to compare the first user-habit data with pre-stored standard user-habit data is configured to control the general-purpose processor to: extract features from the first user-habit data to obtain P parameters, where P is an integer greater than 1; acquire, from the standard user-habit data, target standard user-habit data corresponding to generation time of the first user-habit data; extract features from the target standard user-habit data to obtain Q parameters; determine the similarity value according to the Q parameters and the P parameters.

In at least one implementation, the first user-habit data contains M data records and M is an integer greater than 1.

In at least one implementation, the extracting unit 530 configured to control the general-purpose processor to extract, from the first user-habit data, normal user-habit data is configured to control the general-purpose processor to: analyze the M data records to obtain M parameter sets; filter the M parameter sets to obtain N parameter sets; train the N parameter sets with a preset negative-sample classifier to obtain K parameter sets, wherein K is a positive integer, and determine data records corresponding to the K parameter sets as the normal user-habit data.

In at least one implementation, the updating unit 540 configured to control the general-purpose processor to update the standard user-habit data according to the normal user-habit data is configured to: extract features from the normal user-habit data to obtain a first feature set; extract features from the standard user-habit data corresponding to the normal user-habit data to obtain a second feature set; determine an adjustment parameter set corresponding to the second feature set according to the first feature set and the second feature set; adjust control parameters corresponding to a preset positive-sample classifier according to the adjustment parameter set; adjust the standard user-habit data through the preset positive-sample classifier adjusted.

Figure 5B:
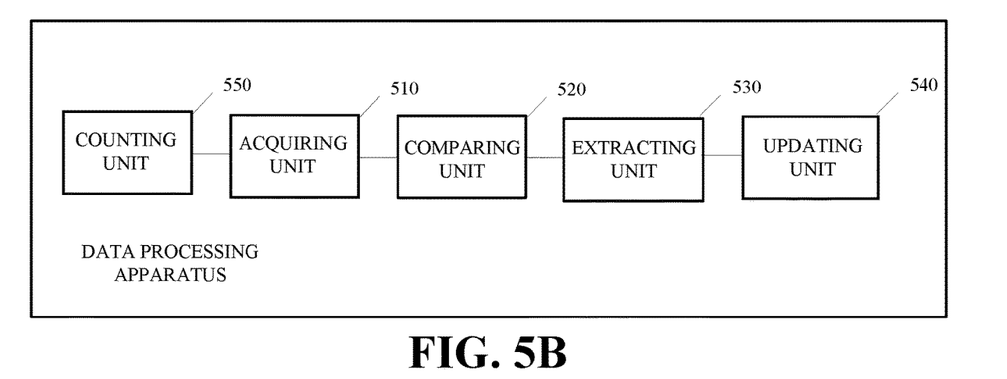
FIG. 5B is a schematic structural diagram illustrating another data processing apparatus according to an implementation of the disclosure.

In at least one implementation, as illustrated in FIG. 5B, FIG. 5B illustrates an alternative structure of the data processing apparatus depicted in FIG. 5B. Compared with the FIG. 5A, the data processing apparatus illustrated in FIG. 5B further includes a counting unit 550.

The counting unit 550 is configured to count the number of times of occurrence of abnormal events. When the result counted by the counting unit 550 is that the number of times of occurrence is greater than a second threshold similarity value, the acquiring unit 510 proceeds to acquire the first user-habit data.

In at least one implementation, the general-purpose processor includes an application processor and an artificial intelligence (AI) module. The AI module is integrated with the application processor and configured to perform at least one operation that the general-purpose processor is operable to execute.

In at least one implementation, the general-purpose processor includes an application processor and an AI module. The AI module is separated from the application processor and configured to perform at least one operation that the general-purpose processor is operable to execute.

The acquiring unit 510, the comparing unit 520, the extracting unit 530, the updating unit 540, and the counting unit 550 may all be AI modules, application processors, or general-purpose processors. The AI module and the application processor can be, for example, central processing units (CPUs), general-purpose processors, digital signal processors (DSPs), application-specific integrated circuits (ASICs), field programmable gate arrays (FPGAs), or other programmable logic devices, transistor logic devices, hardware components, or any combination thereof. Various exemplary logical blocks, modules, and circuits described in conjunction with the disclosure may be achieved or implemented. The application processor and the AI module can be a combination of computing functions, for example, a combination of one or more microprocessors, a combination of the DSP and a microprocessor, and the like.

It can be understood that the functions of the program modules of the data processing apparatus in this implementation may be specifically implemented according to the method in the foregoing method implementations. For a specific implementation process thereof, reference may be made to the related description of the foregoing method implementations, and details are not described herein again.

Figure 6:
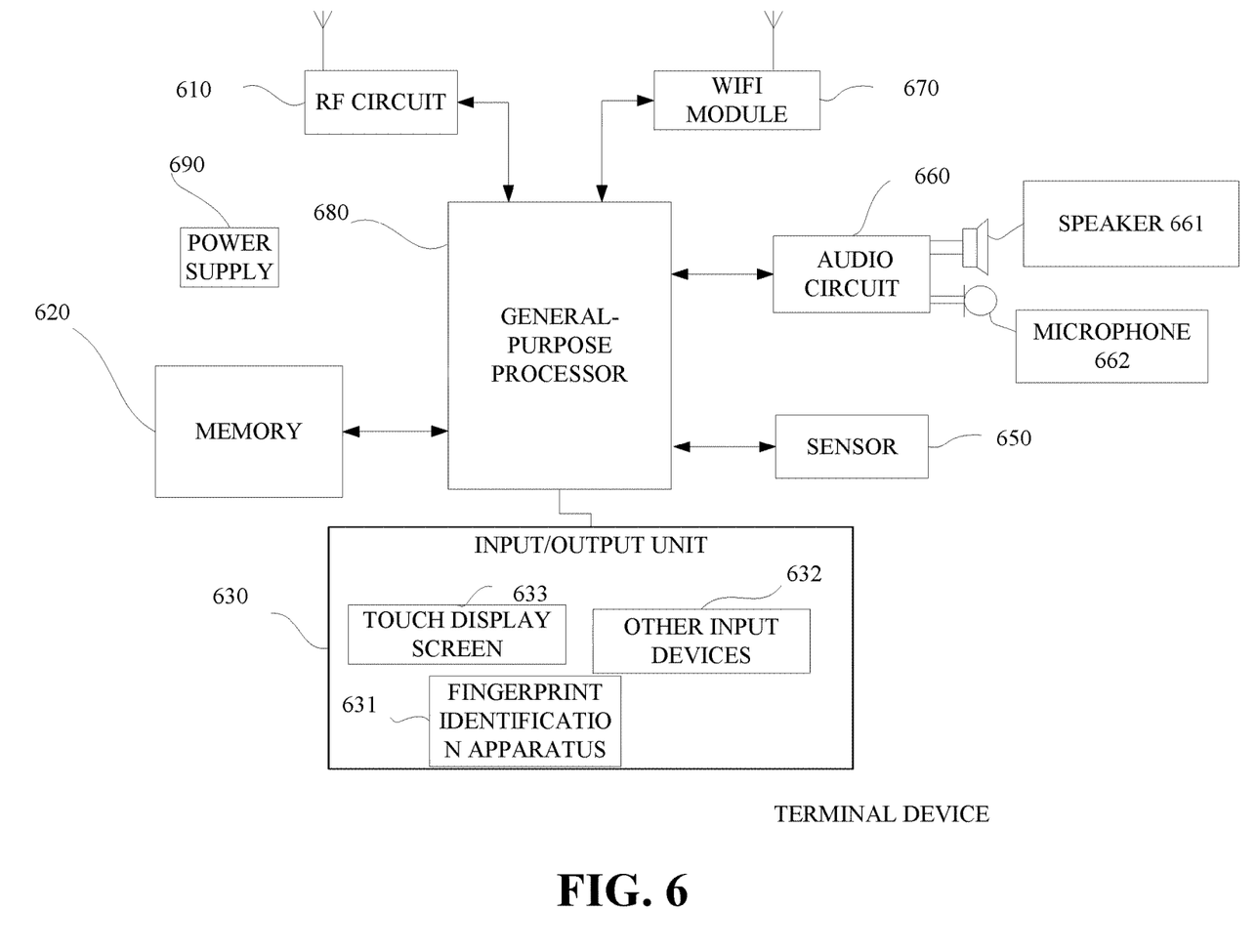
FIG. 6 is a schematic structural diagram illustrating yet another terminal device according to an implementation of the disclosure.

Implementations of the disclosure provide another terminal device. As illustrated in FIG. 6, only parts related to the implementation of the disclosure are illustrated for the convenience of description. For technical details not described, reference may be made to the method implementations of the present disclosure. The terminal device may be any terminal device, such as a mobile phone, a tablet computer, a personal digital assistant (PDA), a point of sale terminal (POS), an on-board computer, and the like. The following describes a mobile phone as an example of the terminal device.

FIG. 6 is a block diagram of a part of a structure of a mobile phone related to a terminal device according to an implementation of the disclosure. Referring to FIG. 6, the mobile phone includes an RF (radio frequency) circuit 610, a memory 620, an input/output unit 630, a sensor 650, an audio circuit 660, a Wi-Fi (wireless fidelity) module 670, a general-purpose processor 680, and a power supply 690 and other components. Those skilled in the art can understand that the structure of the mobile phone illustrated in FIG. 6 does not constitute any limitation on a mobile phone. The mobile phone configured to implement technical solutions of the disclosure may include more or fewer components than illustrated, or may combine certain components or different components.

In the following, various components of the mobile phone will be described in detail with reference to FIG. 6.

The input unit 630 may be configured to receive input digital or character information and generate key signal input associated with user setting and function control of the mobile phone. As one implementation, the input unit 630 may include a touch display screen 633, a fingerprint identification apparatus 631 and other input devices 632. The fingerprint identification apparatus 631 can be integrated with the touch display screen 633 and has a fingerprint identification area located in a first area of the touch display screen 633. The input unit 630 may further include the other input devices 632. As one implementation, the other input devices 632 may include, but not limited to, one or more of a physical keyboard, a function key (such as a volume control key, a switch key, etc.), a trackball, a mouse, a joystick, and the like.

The general-purpose processor 680 is configured to perform the following operations. First user-habit data are acquired. The first user-habit data are compared with pre-stored standard user-habit data to obtain a similarity value. Normal user-habit data are extracted from the first user-habit data when the similarity value is smaller than a first threshold similarity value. The standard user-habit data are updated according to the normal user-habit data.

The general-purpose processor 680 is a control center of the mobile phone and connects various parts of the entire mobile phone through various interfaces and lines. By running or executing software programs and/or modules stored in the memory 620 and invoking data stored in the memory 620, the general-purpose processor 680 can execute various functions of the mobile phone and conduct data processing, so as to monitor the mobile phone as a whole. The general-purpose processor 680 may include one or more processing units. The general-purpose processor 680 may be integrated with an application processor and a modem processor, where the application processor is mainly configured to handle an operating system, a user interface, applications, and so on. The modem processor is mainly configured to deal with wireless communication. It will be appreciated that the modem processor mentioned above may not be integrated into the general-purpose processor 680.

In addition, the memory 620 may include a high-speed RAM, and may further include a non-volatile memory such as at least one disk storage device, a flash device, or other non-volatile solid storage devices.

The RF circuit 610 is configured to receive or transmit information. Generally, the RF circuit 610 includes but is not limited to an antenna, at least one amplifier, a transceiver, a coupler, a low noise amplifier (LNA), a duplexer and the like. In addition, the RF circuit 610 may also communicate with other devices via wireless communication and the network. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The mobile phone may also include at least one sensor 650, such as a light sensor, a motion sensor, and other sensors. As one implementation, the light sensor may include an ambient light sensor and a proximity sensor, among which the ambient light sensor may adjust brightness of the touch display screen 633 according to ambient lights. The proximity sensor may turn off the touch display screen 633 and/or backlight when the mobile phone reaches nearby the ear. As a kind of the motion sensor, an accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related the applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 660, a speaker 661, a microphone 662 may provide an audio interface between the user and the mobile phone. The audio circuit 660 may convert the received audio data into electrical signals and transfer the electrical signals to the speaker 661; thereafter the speaker 661 converts the electrical signals into sound signals to output. On the other hand, the microphone 662 converts the received sound signals into electrical signals, which will be received and converted into audio data by the audio circuit 660 to output. The audio data is then processed and transmitted by the general-purpose processor 680 via the RF circuit 610 to another mobile phone for example, or, the audio data is output to the memory 620 for further processing.

Wi-Fi belongs to a short-range wireless transmission technology. With aid of the Wi-Fi module 670, the mobile phone may assist the user in E-mail receiving and sending, webpage browsing, access to streaming media and the like. Wi-Fi provides users with wireless broadband Internet access. Although the Wi-Fi module 670 is illustrated in FIG. 6, it should be understood that the Wi-Fi module 670 is not essential to the mobile phone and can be omitted according to actual needs without departing from the essential nature of the present disclosure.

The mobile phone also includes a power supply 690 (e.g., a battery) that supplies power to various components. For instance, the power supply 690 may be logically connected to the general-purpose processor 680 via a power management system to enable management of charging, discharging, and power consumption through the power management system.

Although not illustrated, the mobile phone may further include a camera, a Bluetooth module, etc., and the disclosure will not elaborate herein.

Implementations of the present disclosure also provide a non-transitory computer-readable storage medium, on which a computer program is stored. The computer program is executed by a processor to carry out following actions. First user-habit data is acquired. A similarity value is determined based on the first user-habit data and pre-stored standard user-habit data. Normal user-habit data is extracted from the first user-habit data, in response to the determination that the similarity value is smaller than a threshold similarity value. The standard user-habit data is updated according to the normal user-habit data.

The computer program executed by the processor to carry out the action of determining a similarity value based on the first user-habit data and pre-stored standard user-habit data is executed by the processor to carry out following actions. Features are extracted from the first user-habit data to obtain P parameters, where P is an integer greater than 1. Target standard user-habit data corresponding to generation time of the first user-habit data is acquired from the standard user-habit data. Features are extracted from the target standard user-habit data to obtain Q parameters, where Q is an integer equal to or greater than P. The similarity value is determined according to the Q parameters and the P parameters.

The computer program executed by the processor to carry out the action of extracting, from the first user-habit data, normal user-habit data is executed by the processor to carry out following actions. M data records contained in the first user-habit data are analyzed to obtain M parameter sets, where M is an integer greater than 1. The M parameter sets are filtered to obtain N parameter sets. The N parameter sets are trained with a preset negative-sample classifier to obtain K parameter sets, where K is a positive integer. Data records corresponding to the K parameter sets are determined as the normal user-habit data.

The computer program executed by the processor to carry out the action of updating the standard user-habit data according to the normal user-habit data is executed by the processor to carry out following actions. Features are extracted from the normal user-habit data to obtain a first feature set. Features are extracted from the standard user-habit data to obtain a second feature set. An adjustment parameter set corresponding to the second feature set is determined according to the first feature set and the second feature set. Control parameters corresponding to a preset positive-sample classifier are adjusted according to the adjustment parameter set. The standard user-habit data are adjusted through the preset positive-sample classifier adjusted.

Implementations of the present disclosure also provide a computer program product. The computer program product includes a non-transitory computer-readable storage medium storing computer programs. The computer programs are operable with a computer to perform all or part of the operations of any of the methods described in the above method implementations. The computer program product may be a software installation package. The computer can be a terminal device or other equipment.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), a disk or a compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A terminal device, comprising:
   at least one processor; and
   a computer readable storage, coupled to the at least one processor and storing at least one computer executable instruction thereon, which when executed by the at least one processor, cause the at least one processor to:
   acquire first user-habit data;
   determine a similarity value based on the first user-habit data and standard user-habit data;
   extract, from the first user-habit data, normal user-habit data in response to a determination that the similarity value is smaller than a first threshold similarity value; and
   update the standard user-habit data according to the normal user-habit data.

2. The terminal device of claim 1, wherein the instructions to determine the similarity value based on the first user-habit data and standard user-habit data further comprise instructions, which when executed by the at least one processor, cause the at least one processor to:
   extract features from the first user-habit data to obtain P parameters, wherein P is an integer greater than 1;
   acquire, from the standard user-habit data, target standard user-habit data corresponding to a generation time of the first user-habit data;

extract features from the target standard user-habit data to obtain Q parameters, wherein Q is an integer equal to or greater than P; and determine the similarity value according to the Q parameters and the P parameters.

3. The terminal device of claim 2, wherein the instructions to determine the similarity value according to the Q parameters and the P parameters further comprise instructions, which when executed by the at least one processor, cause the at least one processor to:

determine variance or covariance between the P parameters and the Q parameters as the similarity value.

4. The terminal device of claim 1, wherein the first user-habit data comprises M data records, and M is an integer greater than 1, wherein the instructions to extract, from the first user-habit data, the normal user-habit data further comprise instructions, which when executed by the at least one processor, cause the at least one processor to:

analyze the M data records to obtain M parameter sets;

filter the M parameter sets to obtain N parameter sets;

train the N parameter sets with a preset negative-sample classifier to obtain K parameter sets, wherein K is a positive integer; and determine data records corresponding to the K parameter sets as the normal user-habit data.

5. The terminal device of claim 1, wherein the instructions to update the standard user-habit data according to the normal user-habit data further comprise instructions, which when executed by the at least one processor, cause the at least one processor to:

extract features from the normal user-habit data to obtain a first feature set;

extract features from the standard user-habit data to obtain a second feature set;

determine an adjustment parameter set corresponding to the second feature set according to the first feature set and the second feature set;

adjust control parameters corresponding to a preset positive-sample classifier according to the adjustment parameter set; and adjust the standard user-habit data through the preset positive-sample classifier adjusted.

6. The terminal device of claim 1, wherein the instructions further comprise instructions, which when executed by the at least one processor, cause the at least one processor to:

count a number of times of occurrence of abnormal events; and acquire the first user-habit data when the number of times of occurrence of abnormal events is greater than a second threshold similarity value.

7. The terminal device of claim 1, wherein the at least one processor comprises an application processor and an artificial intelligence (AI) module, wherein the AI module is integrated with or separated from the application processor and configured to perform at least one of:

acquiring the first user-habit data;

determining the similarity value based on the first user-habit data and standard user-habit data;

extracting, from the first user-habit data, the normal user-habit data in response to the determination that the similarity value is smaller than a first threshold similarity value; and updating the standard user-habit data according to the normal user-habit data.

8. The terminal device of claim 1, wherein the standard user-habit data is obtained by training usage patterns of a user for at least one application over a period of time by the terminal device.

9. The terminal device of claim 1, wherein the first user-habit data is obtained from usage records of the user, and one usage record is generated each time a user operates the terminal device.

10. A method for data processing, comprising:

acquiring first user-habit data;

determining a similarity value based on the first user-habit data and pre-stored standard user-habit data;

extracting, from the first user-habit data, normal user-habit data in response to a determination that the similarity value is smaller than a first threshold similarity value; and updating the pre-stored standard user-habit data according to the normal user-habit data.

11. The method of claim 10, wherein determining the similarity value based on the first user-habit data and the pre-stored standard user-habit data comprises:

extracting features from the first user-habit data to obtain P parameters, wherein P is an integer greater than 1;

acquiring, from the pre-stored standard user-habit data, target standard user-habit data corresponding to a generation time of the first user-habit data; and extracting features from the target standard user-habit data to obtain Q parameters and determining the similarity value according to the Q parameters and the P parameters, wherein Q is an integer equal to or greater than P.

12. The method of claim 11, wherein determining the similarity value according to the Q parameters and the P parameters comprises:

determining variance or covariance between the P parameters and the Q parameters as the similarity value.

13. The method of claim 10, wherein the first user-habit data comprises M data records and M is an integer greater than 1, and the extracting, from the first user-habit data, the normal user-habit data comprises:

analyzing the M data records to obtain M parameter sets and filtering the M parameter sets to obtain N parameter sets; and training the N parameter sets with a negative-sample classifier to obtain K parameter sets, wherein K is a positive integer, and determining data records corresponding to the K parameter sets as the normal user-habit data.

14. The method of claim 13, wherein the negative-sample classifier is constructed via negative samples obtained from abnormal user-habit data.

15. The method of claim 10, wherein the updating the pre-stored standard user-habit data according to the normal user-habit data comprises:

extracting features from the normal user-habit data to obtain a first feature set;

extracting features from the pre-stored standard user-habit data to obtain a second feature set;

determining an adjustment parameter set corresponding to the second feature set according to the first feature set and the second feature set;

adjusting control parameters corresponding to a positive-sample classifier according to the adjustment parameter set; and adjusting the pre-stored standard user-habit data through a preset positive-sample classifier adjusted.

16. The method of claim 15, wherein the positive-sample classifier is constructed via positive samples obtained from normal user-habit data.

17. A non-transitory computer-readable storage medium storing a computer program which, when executed by a processor, causes the processor to:
acquire first user-habit data;
determine a similarity value based on the first user-habit data and pre-stored standard user-habit data;
extract, from the first user-habit data, normal user-habit data in response to a determination that the similarity value is smaller than a threshold similarity value; and
update the pre-stored standard user-habit data according to the normal user-habit data.

18. The non-transitory computer-readable storage medium of claim 17, wherein the computer program executed by the processor to determine the similarity value based on the first user-habit data and the pre-stored standard user-habit data further comprise computer programs to:
extract features from the first user-habit data to obtain P parameters, wherein P is an integer greater than 1;
acquire, from the pre-stored standard user-habit data, target standard user-habit data corresponding to a generation time of the first user-habit data;
extract features from the target standard user-habit data to obtain Q parameters, wherein Q is an integer equal to or greater than P; and
determine the similarity value according to the Q parameters and the P parameters.

19. The non-transitory computer-readable storage medium of claim 17, wherein the computer program executed by the processor to extract, from the first user-habit data, the normal user-habit data further comprise computer programs to:
analyze M data records contained in the first user-habit data to obtain M parameter sets, wherein M is an integer greater than 1;
filter the M parameter sets to obtain N parameter sets;
train the N parameter sets with a preset negative-sample classifier to obtain K parameter sets, wherein K is a positive integer; and
determine data records corresponding to the K parameter sets as the normal user-habit data.

20. The non-transitory computer-readable storage medium of claim 17, wherein the computer program executed by the processor to update the pre-stored standard user-habit data according to the normal user-habit data further comprise computer programs to:
extract features from the normal user-habit data to obtain a first feature set;
extract features from the pre-stored standard user-habit data to obtain a second feature set;
determine an adjustment parameter set corresponding to the second feature set according to the first feature set and the second feature set;
adjust control parameters corresponding to a preset positive-sample classifier according to the adjustment parameter set; and
adjust the pre-stored standard user-habit data through the preset positive-sample classifier adjusted.

\* \* \* \* \*